US006580405B1

(12) United States Patent
Yamazaki et al.

(10) Patent No.: US 6,580,405 B1
(45) Date of Patent: Jun. 17, 2003

(54) INFORMATION PROCESSING DEVICE

(75) Inventors: Shunpei Yamazaki, Tokyo (JP); Yoshiharu Hirakata, Kanagawa (JP); Takeshi Nishi, Kanagawa (JP); Hideaki Kuwabara, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/244,760

(22) Filed: Feb. 5, 1999

(30) Foreign Application Priority Data

Feb. 9, 1998 (JP) ............................................ 10-044658

(51) Int. Cl.$^7$ ................................................ G09G 3/36
(52) U.S. Cl. ................................. 345/7; 345/8; 345/20; 345/43; 345/103; 345/149; 345/206; 349/11; 349/13; 349/15; 349/12; 349/14; 348/53
(58) Field of Search ........................ 345/7, 8, 20, 103, 345/149, 43; 349/11, 12, 13, 14, 15

(56) References Cited

U.S. PATENT DOCUMENTS

| 5,643,826 | A | | 7/1997 | Ohtani et al. ................. 437/88 |
| 5,995,936 | A | * | 11/1999 | Brais ......................... 704/275 |
| 6,011,275 | A | | 1/2000 | Ohtani et al. |
| 6,037,635 | A | | 3/2000 | Yamazaki |
| 6,046,712 | A | * | 4/2000 | Beller et al. .................... 345/8 |
| 6,066,518 | A | | 5/2000 | Yamazaki |
| 6,072,193 | A | | 6/2000 | Ohnuma et al. |
| 6,087,245 | A | | 7/2000 | Yamazaki et al. |
| 6,091,378 | A | * | 7/2000 | Richardson et al. ........... 345/7 |
| 6,091,546 | A | * | 7/2000 | Spitzer ......................... 345/8 |
| 6,093,934 | A | | 7/2000 | Yamazaki et al. |
| 6,093,937 | A | | 7/2000 | Yamazaki et al. |
| 6,115,007 | A | * | 7/2000 | Yamazaki ..................... 345/7 |
| 6,097,352 | A | * | 8/2000 | Zavracky et al. ............. 345/7 |
| 6,121,660 | A | | 9/2000 | Yamazaki et al. |
| 6,127,998 | A | * | 10/2000 | Ichikawa et al. ............. 345/50 |
| 6,133,075 | A | | 10/2000 | Yamazaki et al. |
| 6,153,445 | A | | 11/2000 | Yamazaki et al. |
| 6,165,824 | A | | 12/2000 | Takano et al. |

FOREIGN PATENT DOCUMENTS

| EP | 0 499 979 A | 8/1992 |
| EP | 0 686 957 A | 12/1995 |

OTHER PUBLICATIONS

Kuriyama H et al. "Comprehensive Study of Lateral Grain Growth In Poly–Si Films By Films By Excimer Laser Annealing and its Application to Thin Film Transistors", Japanese Journal of Applied Physics, vol. 33, No. 10, Part 01, Oct. 1, 1994, pp. 5657–5662.

Toshiro Shinohara et al.; "High–Performance Polycrstalline Silicon TFTS Using Self–Aligned Grain Boundary Control Technique" Electronics and Communications in Japan, Part II—Electronics, vol. 76, No. 10, Oct. 1, 1993, pp. 99–106.

Ohtani H et al. "Continuous–Grain Silicon Makes the HDTV Retro–Projector Sizzle" Information Display, Nov. 1998, Palisades Inst. Res. Services, USA, vol. 14, No. 11, pp. 22–24.

European Search Report dated Oct. 27, 1999.

(List continued on next page.)

Primary Examiner—Richard Hjerpe
Assistant Examiner—Ali Zamani
(74) Attorney, Agent, or Firm—Eric J. Robinson; Robinson Intellectual Property Law Office, P.C.

(57) ABSTRACT

An information processing device and its system is provided in which a display unit (head mount display) is used and a user carries out an information processing operation while seeing a virtual display screen. Polycrystalline silicon using CGS is used for a semiconductor of a display element of a liquid crystal panel used in the head mount display, so that high speed driving is made possible. The display unit in which frame inversion made in a writing period (60 to 180 Hz) is connected to a control unit and an input operating unit, so that the user can carry out the information processing operation.

35 Claims, 13 Drawing Sheets

OTHER PUBLICATIONS

Ohtani et al. (1998) "Late–News Poster: A 60–in. HDTV Rear Projector with Continuous–Grain–Silicon Technology", H. Ohtani et al., SID 98 DIGEST, pp. 467–470, May 17–22, 1998.

U.S. patent application Ser. No. 09/255,605, including specification, drawing, filing receipt and pending claims, "Information Processing Device", Shunpei Yamazaki et al., Feb. 22, 1999.

* cited by examiner

5nm

5nm

INFORMATION PROCESSING DEVICE

BACKGROUND OF THE INVENTION

1. Field of the Invention

The present invention relates to a display unit called a head mount display, which is mounted on a head and projects a picture in front of eyes, an information processing device using the same, and its system.

2. Description of the Related Art

Conventionally, a user dealing with electronic information carries out an information processing operation by using a device as shown in FIG. 13 which is a schematic view of the information processing device. In the present specification, the information processing operation means to perform input, acquisition, transmission, exchange, storing, classifying, etc, of information by using a computer or the like.

An input terminal unit 11, such as a keyboard or a mouse, is a device by which a user 10 carries out an input operation of information. A control unit 12, such as a computer, connected to the input terminal unit 11 is a device for performing a process, such as storing, calculation, or communication of information. A display unit 13, such as a CRT, is a device for outputting information on a display screen.

Among them, the display unit 13 such as the CRT has a large size, and greatly narrows the space on a desk. Moreover, if its screen size is enlarged to recognize a great deal of display information (characters, pictures, etc.), the space is further narrowed, and its weight becomes considerably heavy, so that the display unit is not suitable for a daily use display. Besides, since the display unit has a bad influence (eyestrain, decline in eyesight, etc.) on human eyes, its long continuous use has been intentionally avoided.

Then a flat display panel using a liquid crystal and the like, which is shallow in the depth of a device as compared with the CRT so that it is lightweight, comes into wide use. Since a liquid crystal panel is lightweight, if it is small, it can be carried. Also, the liquid crystal panel has an advantage that the bad influence on human eyes is small. However, if its screen size becomes large, it becomes expensive as a daily used display. In addition, the flat display panel also narrows the space on a desk.

As a display unit other than the foregoing devices, a display unit called a head mount display (HMD) using a small liquid crystal panel has been known. Since this display unit is mounted on a head and is used, it does not narrow the space, and has a merit that the size of a virtual display screen can be freely changed.

In this display unit (HMD), a picture image is projected on a place distant several cm from a human eye by using an optical system, which image being recognized through human eyes with virtual reality as if the image was displayed on a large display screen. As the scope of its application, plays, such as TV games, appreciation of movies, education, presentation, medical treatment, and the like can be enumerated.

However, the resolution of a conventional HMD is low, and recognition of characters has been difficult. Moreover, when this HMD is continuously used for several hours (two to three hours), considerable fatigue of an eye is felt. Moreover, there is also a case that symptoms like motion sickness occur. Thus, the HMD has been unsuitable for a display unit of an information processing device. It is considered that these problems occur because a distance between the liquid crystal panel and the eye is small so that a flicker becomes noticeable and a bad influence is given to the eye.

This flicker is caused by alternating-current driving that is performed to prevent deterioration of the liquid crystal material and to maintain the quality of display. When a period (polarity inversion period) in which positive and negative polarities of voltage applied to each pixel are inverted comes to be in a frequency range (about 30 Hz) which can be recognized by a human eye, since display when the polarity of a picture signal is positive is subtly different from display when the polarity of the picture signal is negative, the difference is recognized as a flicker.

The number of display pixels of a display has been increasing year after year, and a driving frequency becomes very high for a panel with a large number of pixels. For example, it is said that the NTSC standard requires about 400 thousand pixels, and the HDTV standard requires about 2 million pixels. Thus, the maximum frequency of an input picture signal is about 6 MHz in the NTSC standard, and about 20 MHz to 30 MHz in the HDTV standard. In order to accurately display this picture signal, a clock signal is required to have a frequency (for example, about 50 MHz to 60 MHz) several times higher than that of this picture signal. In future, it is expected that display of high fineness and high quality is increasingly required, and a picture signal with a very fast dot clock is to be treated.

Hitherto, it has been difficult to accurately make alternating current of a picture signal and a clock signal having such a high frequency band range to drive a liquid crystal panel. This is because it has been impossible to form a thin film transistor (TFT) capable of accurately operating in such a high frequency band region by using amorphous silicon or polycrystalline silicon.

When a picture signal with a very fast dot clock comes to be treated, a writing period of the picture signal to a display pixel becomes short, and in a conventional TFT, there have occurred problems that a phase shift, noise, dulling of a signal waveform, and the like occur, and display becomes inaccurate.

SUMMARY OF THE INVENTION

An object of the present invention is to provide an information processing device and its system in which a head mount display is used as a daily use display unit without narrowing space and an information processing operation can be easily carried out by using this display unit.

According to a first aspect of the present invention, an information processing device is characterized in that:

a user carries out an information processing operation by using a display unit comprising flat panel displays for a right eye and a left eye and being mounted on a head of the user; a control unit connected to the display unit; and an input operating unit connected to the control unit.

According to a second aspect of the present invention, an information processing device is characterized in that:

the device comprises a display unit comprising flat panel displays for a right eye and a left eye and being mounted on a head of a user, a communication unit connected to the display unit, and an input operating unit;

the communication unit is used so that the user receives information from a communication partner; and the input operating unit is used so that information is transmitted to the communication partner.

According to a third aspect of the present invention, an information processing device is characterized in that:

the device comprises a display unit comprising flat panel displays for a right eye and a left eye and being mounted on a head of a user, a communication device, an input operating unit, and a unit for converting voice data of the user into characters;

the input operating unit inputs the voice data of the user;

the unit for converting voice data into characters converts the voice data of the user into characters and transmits them to a communication partner.

According to a fourth aspect of the present invention, an information processing device is characterized in that:

the device comprises a display unit comprising flat panel displays for a right eye and a left eye and being mounted on a head of a user, a communication unit, an input operating unit, and a unit for converting voice data of a communication partner into characters;

the input operating unit inputs the voice data of the communication partner; and a conversation with the communication partner is displayed as characters on a virtual display screen provided to the user by the display unit.

According to one aspect of the present invention, in the foregoing first to fourth aspects, the input operating unit is characterized by being a sound collecting unit.

According to one aspect of the present invention, in the foregoing first to fourth aspects, the input operating unit is characterized by being an image pick-up unit.

According to one aspect of the present invention, in each of the foregoing aspects, a channel formation region of a TFT connected to a pixel electrode of the flat panel displays of the display unit is characterized by being made of a semiconductor thin film of a collective of a plurality of rod-like or flattened rod-like crystals formed on an insulating surface.

According to one aspect of the present invention, in each of the foregoing aspects, a surface orientation of the channel formation region is substantially a {110} orientation.

According to one aspect of the present invention, in each of the foregoing aspects, 90% or more of crystal lattices in crystal grain boundaries of the channel formation region have continuity.

According to one aspect of the present invention, in each of the foregoing aspects, the display unit is characterized in that writing of one screen is carried out at 45 Hz to 180 Hz in the flat panel displays, and a polarity of voltage applied to a pixel electrode is inverted for every screen to obtain screen display.

According to one aspect of the present invention, in each of the foregoing aspects, a liquid crystal material of the flat panel displays is an antiferroelectric liquid crystal substantially having no threshold value.

According to one aspect of the present invention, in each of the foregoing aspects, the display unit comprising the flat panel displays for the right eye and the left eye and being mounted on the head of the user is characterized by providing a virtual flat image to the user.

According to one aspect of the present invention, in each of the foregoing aspects, the display unit comprising the flat panel displays for the right eye and the left eye and being mounted on the head of the user is characterized by providing a virtual three-dimensional image to the user.

DETAILED DESCRIPTION OF THE PREFERRED EMBODIMENTS

Figure 1:
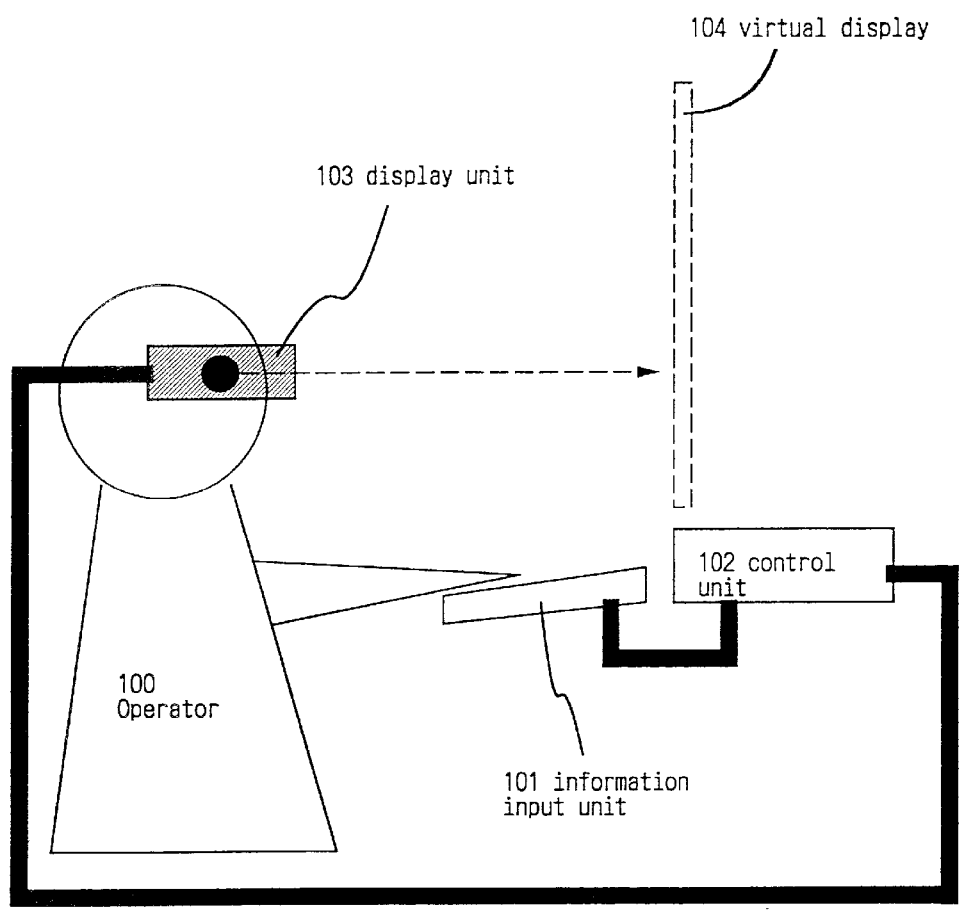
FIG. 1 is a view showing an outline of an information processing device.

As schematically shown in FIG. 1, the present invention is an information processing device and its system in which a user 100 puts on a display unit 103 (head mount display) on a head, and carries out an information processing operation by using an input terminal unit 101 and a control unit 102 while seeing a virtual display screen 104.

The display unit 103 of the present invention is not particularly limited as long as liquid crystal panels for a right eye and a left eye are mounted on a head and a virtual display screen (display screen of a flat picture or three-dimensional picture) having such resolution that characters can be recognized can be obtained.

Besides, the liquid crystal panel of the display unit of the present invention can be effectively manufactured by using a semiconductor film for a switching element which is formed of continuous grain boundary crystal silicon (Continuous Grain Silicon: CGS).

In addition, the display unit of the present invention is driven in a frequency range (about 45 Hz or more), in which recognition can not be made by a human eye even if the distance between the liquid crystal panel and the eye is several cm, with frame inversion driving in which positive and negative polarities of voltages applied to all pixels are inverted for every frame (one screen). However, in the present invention, as long as line sequential scanning of pixel TFTs is carried out, and polarity inversion driving is carried out in a frequency range (about 45 Hz or more) in which recognition can not be made by a human eye, the liquid crystal panel is not particularly limited. For example, such a liquid crystal panel may be used that line inversion driving is carried out in which positive and negative polarities of voltages applied to a specific pixel group (for example, a pixel group for one line, or a pixel group for one column) are inverted for every one frame or certain period, or dot inversion driving is carried out in which positive and negative polarities of voltages applied to each pixel are inverted.

The input terminal unit 101 of the present invention is not particularly limited as long as the user can input information into the control unit. As typical units, a keyboard, a mouse, a controller, a camera, a microphone, and the like can be enumerated.

The control unit 102 is not particularly limited as long as the unit includes at least means for receiving information from the input terminal unit, means for storing electronic information, and means for transmitting picture information to the display unit.

As the means for inputting information into the control unit and means for transmitting picture information to the display unit, an electric cord wiring line, or an optical fiber can be used. It is also appropriate that a cordless structure is adopted so that information is transmitted through light.

In the following, although embodiments of the present invention will be described in more detail, it is needless to say that the present invention is not limited to these embodiments.

EMBODIMENT 1

Figure 2:
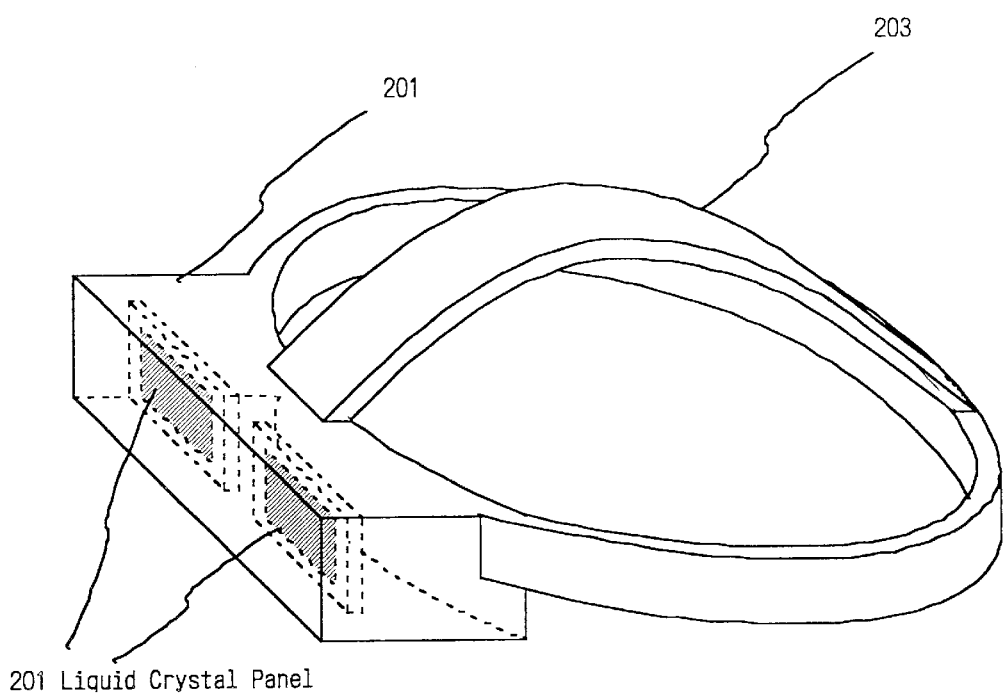
FIG. 2 is a view showing an outline of a head mount display.

FIG. 1 is a schematic view of an information processing device of this embodiment. FIG. 2 is a view showing the outer appearance of a display unit (head mount display) shown in this embodiment. As a display method of a picture in this embodiment, 2D (flat picture) is displayed.

As shown in FIG. 1, a display unit 103 is electrically connected to an input terminal unit 101 and a control unit 102 (computer, etc.). Those three constitute an information processing device and its system.

The display unit shown in FIG. 2 is provided with a band 203 for fixing a main body 201 in front of user's eyes and small active matrix type liquid crystal panels 202 of 0.2 to 2.6 inches for displaying pictures. In this embodiment, small liquid crystal panels of 1.4 inches are used. Instead of the band 203, any means may be used for fixing the main body in front of the user's eyes. For example, a frame similar to a frame of eyeglasses may be used.

In the liquid crystal panels, one of the panels is disposed for a right eye and the other is disposed for a left eye. As for how to arrange the liquid crystal panels, in addition to the structure shown in the drawing, it is possible to enumerate a system in which a picture optically modulated by a liquid crystal panel is reflected in a mirror or a half mirror, and it is seen with an eye. Also in this case, the liquid crystal panel is disposed in the main body 201. In this embodiment, an optical system having the same functions as a conventional one is used.

An optical system (concave half mirror, etc.) for enlarging the size of a virtually displayed picture may be provided in the main body 201. In that case, for the purpose of preventing an enlarged picture from roughening, it is preferable to provide a diffuser (diffusing plate) in front of the liquid crystal panel. Moreover, it is also possible to take a structure for providing backlight, a structure for providing a function of adjusting the width between eyes and the like, and a structure having a built-in acoustic unit and the like in the main body 201.

The liquid crystal panel shown in this embodiment is of such a structure that color filters are provided, and a color picture is formed with R (red), G (green) and B (blue). Incidentally, the primary colors for making color display are not limited to the above structure, but suitable setting can be made.

It is also possible to make such a structure that light emitting diodes of R (red), G (green) and B (blue) are used as backlight and are incorporated in the main body 201, so that a color picture is obtained. As color display in this case, for example, if the blink of R, G, and B of the light emitting diodes is repeated in time series for each color, as R, G, B, R, G, B, R . . . , at a frequency three times a writing period (frame frequency) of one screen, it is recognized as a color picture for a human eye. In this case, since color filters are not required, bright display can be obtained.

As a system of a liquid crystal panel, a transmission type requiring backlight is generally used. However, if an optical system is suitably changed, a reflection type can also be used.

Figure 3:
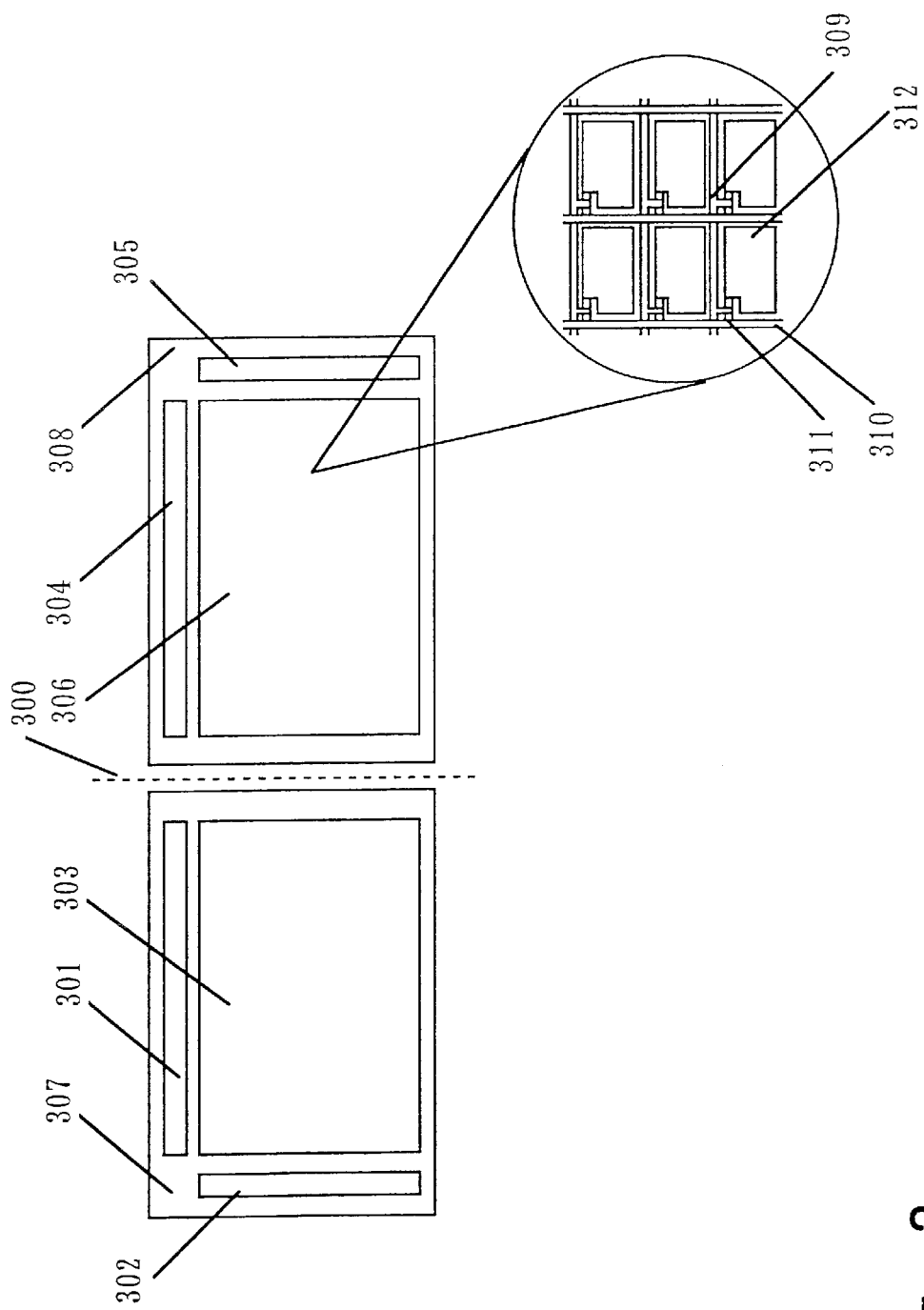
FIG. 3 is a view showing an arrangement structure of a liquid crystal panel.

In the structure shown in this embodiment, the structure of the two liquid crystal panels denoted by 202, especially the structure as to arrangement of pixels is made such as shown in FIG. 3. It is desirable that the pixel size is within the range of 4 $\mu$m×4 $\mu$m to 45 $\mu$m×30 $\mu$m. In this embodiment, the pixel size is 28 $\mu$m×28 $\mu$m. It is desirable that for the purpose of increasing an aperture rate, a pixel of an active matrix region 306 is set so that the area of the pixel becomes small.

In FIG. 3, a glass substrate (or quartz substrate) of the liquid crystal panel for a left eye is designated by 307. On the substrate 307, peripheral driving circuits 301 and 302 are disposed. Moreover, an active matrix region (pixel matrix region) 303 is also disposed thereon.

A glass substrate (or quartz substrate) of the liquid crystal panel for a right eye is designated by 308. On the substrate 308, peripheral driving circuits 304 and 305 are disposed. Moreover, an active matrix region (pixel matrix region) 306 is disposed thereon.

In the active matrix region, a gate line 309 and a source line 310 are disposed like a lattice, and a thin film transistor 311 is disposed near an intersect point thereof. By this thin film transistor, the amount of electric charge held by a pixel electrode 312 is controlled, and the amount of transmission light of the liquid crystal is controlled, whereby such a structure is made that a picture is obtained by combination with other pixels over the entire of the liquid crystal panel.

The arrangement of the peripheral driving circuits is axisymmetric with respect to an axis 300 passing between the right and left liquid crystal panels. This axis 300 is substantially coincident with a line dividing the center of a face in general.

By doing so, it is possible to obtain symmetry between an apparent structure of the right liquid crystal panel seen by the right eye and an apparent structure of the left liquid crystal panel seen by the left eye. Moreover, the arrangement of the liquid crystal panels can be made symmetrical with respect to the symmetrical axis 300.

This becomes important in securing balance in structure. Especially in the head mount display, since the position of the liquid crystal panel is near the eye, this point becomes important.

Figure 4:
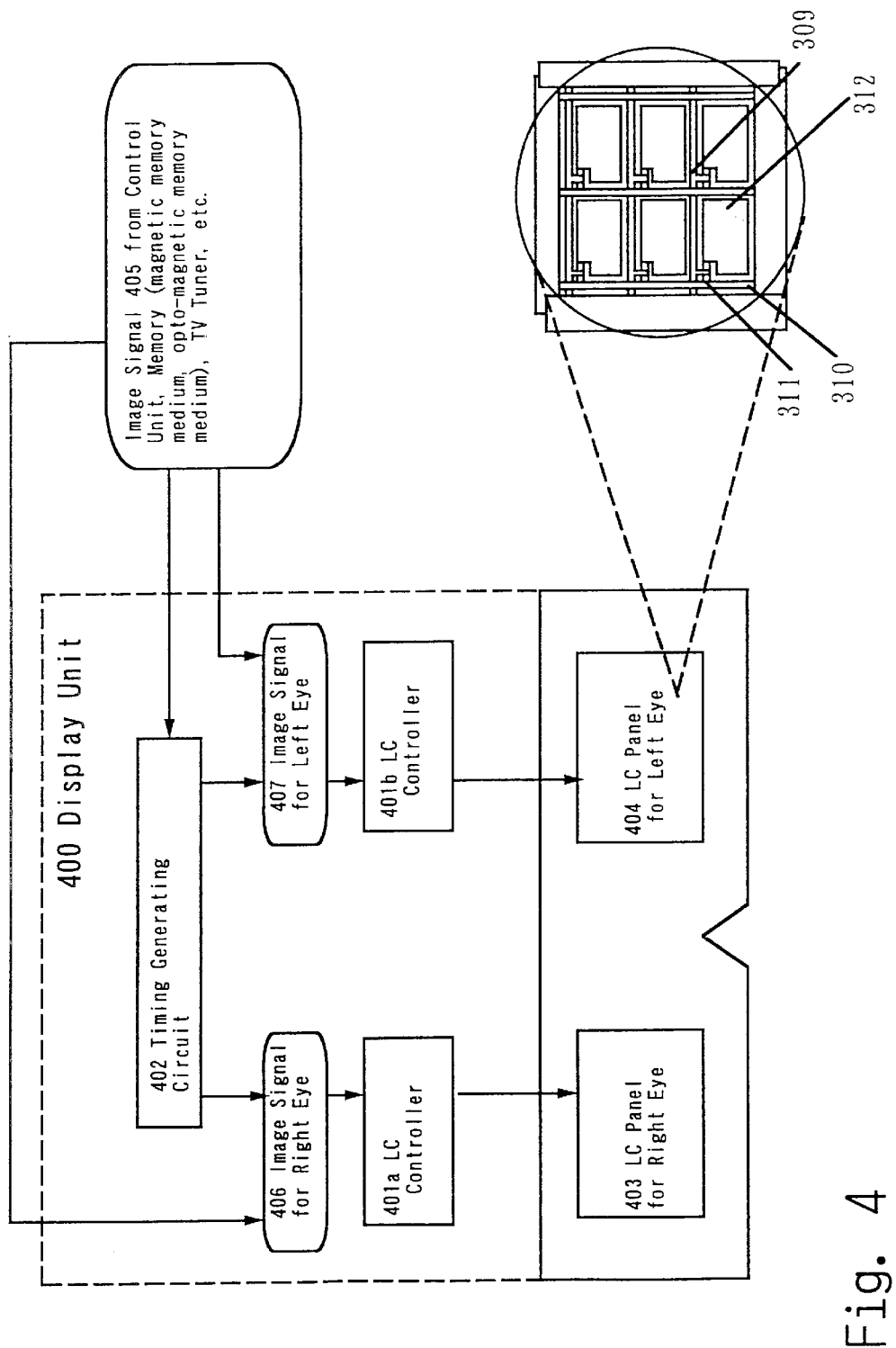
FIG. 4 is a block diagram of a display unit main body.

FIG. 4 shows an example of a block diagram of the inside of the display unit. Incidentally, a liquid crystal panel of FIG. 4 corresponds to that of FIG. 3. The inside of the display unit is provided with liquid crystal controllers 401a and 401b, a timing generating circuit 402, and the like.

The timing generating circuit 402 generates a synchronous signal, such as a clock signal, for adjusting the timing of display. In this embodiment, a process of dividing a signal into two for right and left liquid crystal panels is carried out by an external device (control unit, and the like). The liquid crystal controllers (circuits) 401a and 401b make processing of converting a signal from the outside [picture information signal 405 from the control unit (computer, etc.), a storage device (magneto-optical storage medium, magnetic storage medium, etc.) for storing pictures, a TV tuner, and the like]

into a signal which can be displayed by the left and right liquid crystal panels. However, it is needless to say that the sequence of processing of signals in a display unit main body 400 can be suitably changed by circuit design.

If the liquid crystal controllers 401a and 401b, and the timing generating circuit 402 are formed as peripheral circuits of the liquid crystal panel on the same substrate, it is possible to make the display unit main body further lightweight and integrated.

Moreover, it is also possible to take such a structure that the display unit has a function to cut off information of an outside, or a function to superimpose a virtual screen on a surrounding scene. In the information processing operation, in the case where the outside is cut off, the user can concentrate on the virtual display screen. Moreover, since the user is cut off from the surrounding environment, he or she can relax. In the case where the function to superimpose the virtual screen on the surrounding scene is provided, the virtual display picture and the input device (keyboard, etc.) can be seen at the same time, so that the operation of information processing can be easy. Of course, it is desirable to employ such a structure that both the foregoing functions are provided, and a changing device is provided so that the user can freely determine the change of those. Moreover, it is also possible to take such a structure that the display unit is provided with a function to automatically make a change according to an input picture signal.

As the display method of a picture of this embodiment, since 2D (flat picture) is displayed, the same signals are formed as a picture signal 406 for a right eye and as a picture signal 407 for a left eye by the liquid crystal controllers and are inputted to the liquid crystal panels.

In the liquid crystal panel (liquid crystal panel 403 for a right eye, liquid crystal panel 404 for a left eye) used in the display unit of the present invention, line sequential scanning of pixel TFTs is carried out, and the number of pixels are so enormous that it can cope with the future ATV (Advanced TV). Thus, the panel has high resolution of XGA or more, for example, 1920×1280 in the horizontal and vertical.

The display unit of the present invention is driven with frame inversion driving in which positive and negative polarities of voltages applied to all pixels are inverted for each frame (one screen) in a frequency range (about 60 Hz or more) in which recognition can not be made by a human eye even if the distance between the liquid crystal panel and the eye is as small as several cm. In this embodiment, the positive and negative polarities of voltages applied to all pixels are inverted for every frame (one screen) at the frequency of 60 Hz.

The liquid crystal panel of the present invention is characterized in that a channel formation region of a switching element (TFT) is formed of continuous grain boundary crystal silicon (Continuous Grain Silicon: CGS), line sequential scanning of pixel TFTs are carried out, and alternating-current driving is carried out in the frequency range (about 45 Hz to 180 Hz, preferably 60 to 85 Hz) in which recognition can not be made by a human eye.

EMBODIMENT 2

This embodiment shows an example in which a display unit (head mount display) is used to virtually display 3D (three-dimensional picture) image. This embodiment will be described with reference to FIG. 4. A liquid crystal panel of a display device is characterized in that a semiconductor film of a switching element is formed of continuous grain boundary crystal silicon (CGS), line sequential scanning of pixel TFTs is carried out, and alternating-current driving is carried out in the frequency range (about 45 Hz to 180 Hz) in which recognition can not be made by a human eye.

For the 3D (three-dimensional picture) image, two different picture information, that is, a picture signal 406 for a right eye and a picture signal 407 for a left eye are prepared. In this embodiment, two different picture signals are formed by an external unit (control unit, storage unit, etc.), and they are inputted into a liquid crystal panel for a right eye and a liquid crystal panel for a left eye, respectively, so that the display unit is simplified.

In the case where two picture signals 406 and 407 are obtained by two image pick-up devices for the purpose of taking three-dimensional pictures, it is appropriate that the obtained picture information is directly used.

The foregoing two different picture signals are formed by liquid crystal controller 401a or 401b, and are inputted into the liquid crystal panel for the right eye and the liquid crystal panel for the left eye, so that a 3D (three-dimensional picture) image is obtained. That is, in the liquid crystal controllers 401a and 401b, a picture information signal 405 is converted into such a signal that pictures displayed on the liquid crystal panels are recognized as a 3D (three-dimensional picture) image by a human eye. However, it is needless to say that the sequence of signal processing in a display unit main body 400 can be suitably changed by circuit design.

In addition, it is preferable to take such a structure that a changing switch or the like is provided in the display unit main body 400 so that 2D (flat picture) can also be displayed.

EMBODIMENT 3

In this embodiment, an example of manufacturing steps in which an active matrix region and a peripheral driving circuit are integrated on one glass substrate or a quartz substrate, and further, a liquid crystal panel is manufactured, will be described with reference to FIGS. 5A to 5E. By using the manufacturing steps shown in this embodiment, the liquid crystal panels as shown in FIGS. 2 to 4 can be obtained.

Figure 5:
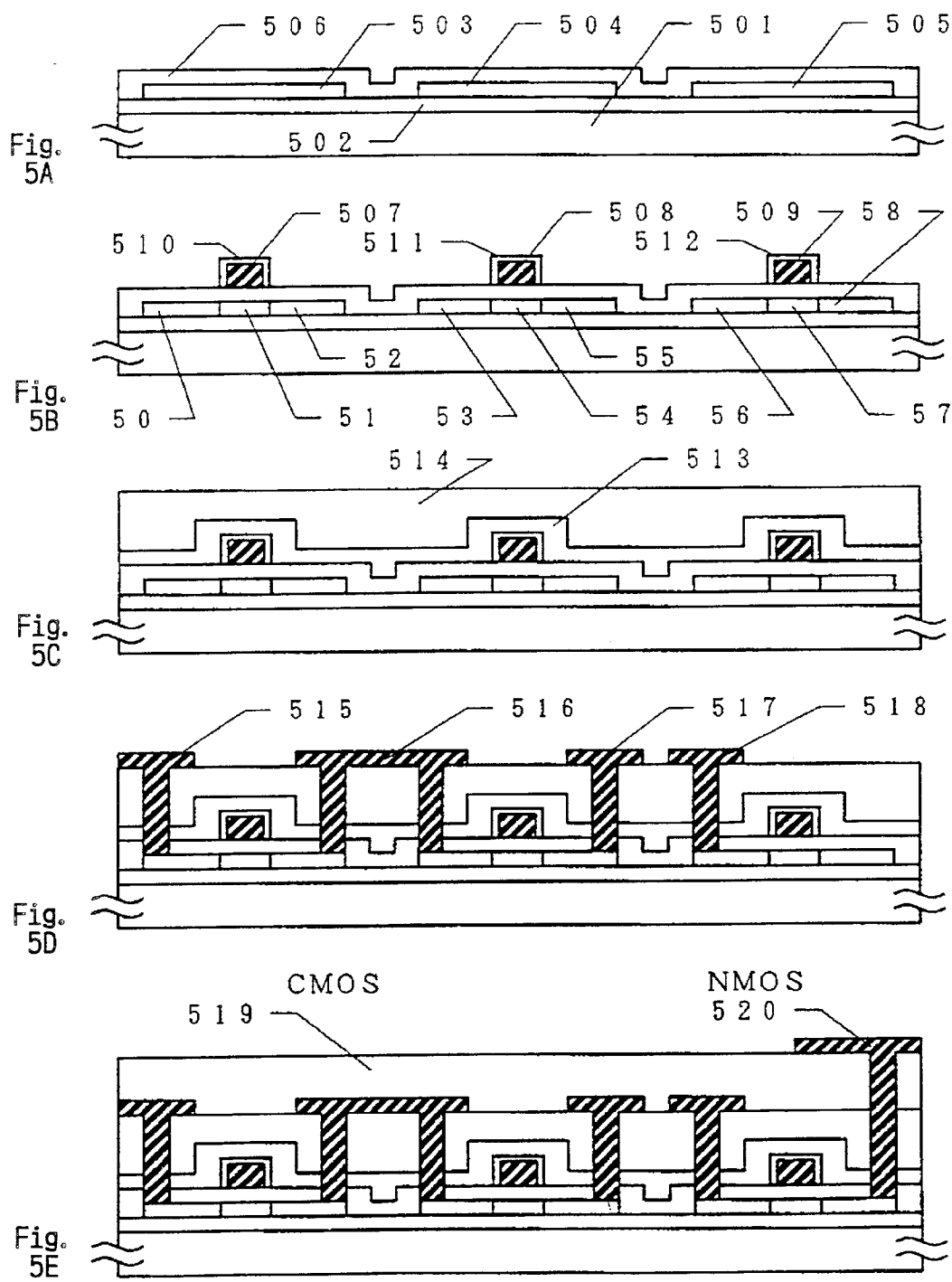
FIGS. 5A to 5E are views illustrating manufacturing steps of TFTs.

First, as shown in FIG. 5A, a silicon oxide film 502 as an under film with a thickness of 3000 Å is formed on an insulating substrate 501 by a sputtering method.

Next, a not-shown amorphous silicon film with a thickness of 400 Å is formed by a low pressure CVD method. This amorphous silicon film is crystallized to obtain a crystal silicon film called continuous grain boundary silicon (CGS). This crystal silicon film is patterned to form patterns 503, 504, and 505 in FIG. 5A. A manufacturing method of this crystal silicon film called CGS will be described later in embodiment 4.

These patterns become active layers of thin film transistors. Here, the pattern 503 becomes an active layer of an NMOS (N-channel thin film MOS transistor) constituting a CMOS circuit of a peripheral driving circuit.

The pattern 504 becomes an active layer of a PMOS (P-channel thin film MOS transistor) constituting the CMOS circuit of the peripheral driving circuit.

The pattern 505 becomes an active layer of an NMOS (N-channel thin film MOS transistor) disposed at a pixel.

In this way, the state shown in FIG. 5A is obtained. Next, after a conductive film is formed, patterning is carried out, and as shown in FIG. 5B, gate electrode patterns 507, 508, and 509 are formed. As a material of the gate electrode, a single layer mainly containing a metal material, such as Ta (tantalum), Al (aluminum), Mo (molybdenum), W (tungsten), and Ti (titanium), or a laminated layer thereof can be used. Silicide that is a compound of silicon with these metal elements can also be used.

In this embodiment, an aluminum film containing scandium of 0.18 wt % and having a thickness of 4000 Å is formed by a sputtering method. Here, scandium is made contained to suppress hillocks or whiskers from being formed by abnormal growth of aluminum in a subsequent step.

After the aluminum film is formed, a not-shown anodic oxidation film having dense film quality and a thickness of about 100 Å is formed on the surface of the aluminum film.

Here, a solution obtained by neutralizing an ethylene glycol solution containing tartaric acid of 3% with ammonia water is used as an electrolytic solution. In this electrolytic solution, platinum is made a cathode, aluminum is made an anode, and current is flown between both the electrodes, so that an anodic oxidation film can be formed on the surface of the aluminum film.

This anodic oxidation film has dense and firm film quality, and has a function to increase the adhesiveness between a subsequently formed resist mask and the aluminum film. The film thickness of this anodic oxidation film can be generally controlled by an applied voltage.

After the not-shown aluminum with the not-shown anodic oxidation film is obtained, a resist mask is formed on its surface, and patterning is carried out by using the mask. In this way, the gate electrode patterns 507, 508, and 509 in FIG. 5B are obtained.

After the gate electrode patterns 507, 508, and 509 are obtained, an anodic oxidation film is again formed. The formation of this anodic oxidation film is also carried out by using an electrolytic solution obtained by neutralizing an ethylene glycol solution containing tartaric acid of 3% with ammonia water.

Here, the film thickness of this anodic oxidation film is 1000 Å. This anodic oxidation film has a function to electrically and physically protect the surface of the gate electrode made of aluminum.

Next, doping of impurities to give a conductivity type is carried out by using the gate electrode and the anodic oxidation film thereon as masks. In this step, resist masks are selectively disposed, and doping of (phosphorus) and B (boron) is alternately and selectively carried out by a plasma doping method, so that N-type regions 50, 52, 56, and 58 are formed. Further, P-type regions 53 and 55 are formed.

After the end of doping, irradiation of laser light is carried out, so that the doped impurities are activated and damages at the doping is annealed.

Here, the region 50 becomes a source region of the NMOS, the region 52 becomes a drain region of the NMOS, the region 53 becomes a drain region of the PMOS, and the region 55 becomes a source region of the PMOS. The region 56 becomes a drain region of the NMOS, and the region 58 becomes a source region of the NMOS. The regions 51, 54, and 57 become channel formation regions of the respective thin film transistors.

In this way, the state shown in FIG. 5B is obtained. Then a silicon nitride film 513 constituting a first interlayer insulating film and having a thickness of 2000 Å is formed by a plasma CVD method.

Further, a film 514 constituting the first interlayer insulating film and made of polyimide resin is formed by using a spin coating method. Polyamide, polyimide amide, and the like can be used other than the polyimide resin. Here, a resin material is used for the interlayer insulating film since its surface can be made flat.

In this way, the state shown in FIG. 5C is obtained. Then contact holes are formed, and electrodes 515, 516, 517, and 518 made of a titanium film and of a lamination film of an aluminum film and a titanium film are formed.

Here, the thickness of the titanium film is 1000 Å, and the thickness of the aluminum film is 2000 Å. The respective films are formed by a sputtering method.

In this state, the CMOS circuit constituting the peripheral driving circuit is formed. The electrode 518 becomes a source line of an active matrix circuit or one extending from the source line.

In this way, the state shown in FIG. 5D is obtained. Next, a second interlayer insulating film 519 made of polyimide resin is formed. Then a contact hole is formed, and a pixel electrode 520 made of ITO is formed.

In this way, the state shown in FIG. 5E is obtained. After the state shown in FIG. 5E is obtained, a heat treatment in a hydrogen atmosphere at 350° C. is carried out for one hour. In this way, the TFT is manufactured.

Figure 6:
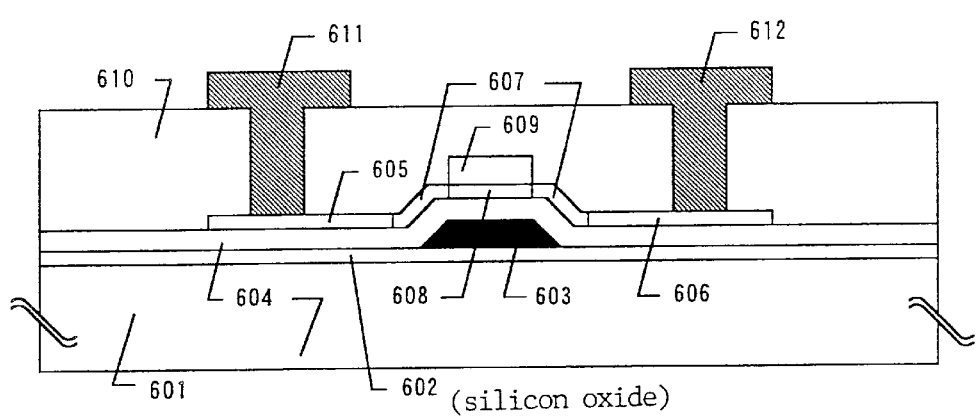
FIG. 6 is a view showing an example of a structure of a bottom-type TFT.

In this embodiment, although a top-gate type TFT is exemplified, a structure using a bottom-gate type TFT may be adopted. FIG. 6 shows an example of a structure of a bottom-gate type TFT. Reference numeral 601 denotes a substrate, 602 denotes an under film, 603 denotes a gate electrode, 604 denotes a gate insulating film, 605 denotes a source region, 606 denotes a drain region, 607 denotes an LDD region, 608 denotes a channel formation region, 609 denotes a channel protecting film, 610 denotes an interlayer insulating film, 611 denotes a source electrode, and 612 denotes a drain electrode.

In the case where the structure of the TFT is of the bottom-gate type, in the same way, the channel formation region 608 is formed by using a continuous grain boundary crystal silicon film called CGS. That is, in the present invention, the structure of a TFT is not limited to a particular structure.

Thereafter, a plurality of TFTs formed of CGS constitute on the substrate a pixel matrix circuit 703, a gate side driving circuit 704, a source side driving circuit 705, and a logic circuit 706. An opposite substrate 707 is bonded to such an active matrix substrate. A liquid crystal layer (not shown) is held between the active matrix substrate and the opposite substrate 707 (FIG. 7).

Figure 7:
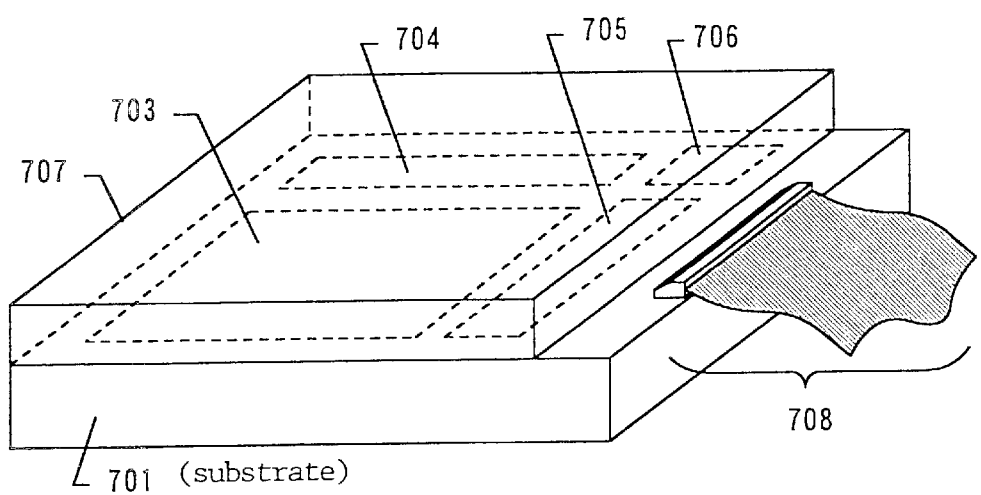
FIG. 7 is a view showing an example of a structure of a liquid crystal panel.

In the structure shown in FIG. 7, it is desirable that all sides of the active matrix substrate except one side are made coincident with sides of the opposite substrate. By doing so, the number of pieces taken from a large substrate can be effectively increased. In the foregoing one side, a part of the opposite substrate is removed to expose a part of the active matrix substrate, and an FPC (Flexible Print Circuit) 708 is attached thereto. As the need arises, an IC chip (semiconductor circuit constituted by MOSFETs formed on single crystal silicon) may be mounted on this portion.

Since a TFT including an active layer of CGS has a very high operation speed, it is possible to integrally form a signal processing circuit driven with a high frequency of several hundreds MHz to several GHz on the same substrate as a pixel matrix circuit is formed. That is, a liquid crystal module shown in FIG. 7 realizes a system-on-panel.

Incidentally, the present invention is applied not only to a liquid crystal display unit of a driving circuit integration type, but also to a so-called external display unit in which a driving circuit is formed on a substrate different from a liquid crystal panel.

In this embodiment, although the description has been made on the case where the present invention is applied to the liquid crystal display unit, it is also possible to construct an active matrix type EL (electroluminescence) display unit and the like. It is also possible to form an image sensor or the like provided with a photoelectric conversion layer on the same substrate.

Like the foregoing liquid crystal display unit, EL display unit, and image sensor, a device having a function to convert an optical signal into an electrical signal or to convert an electrical signal into an optical signal is defined as an electrooptical device. The present invention can be applied to all electrooptical devices if they can be formed by using a semiconductor thin film (CGS) on a substrate having an insulating surface. Of course, this embodiment can be freely combined with embodiment 1 or embodiment 2.

EMBODIMENT 4

A manufacturing method of continuous grain boundary crystal silicon (Continuous Grain Silicon: CGS) of the foregoing embodiment 3 and its structure will be described with reference to FIGS. 8 to 10.

Manufacturing Method of CGS

First, an amorphous semiconductor thin film is formed on an insulating substrate by a low pressure CVD method, a plasma CVD method, or a sputtering method.

As the amorphous semiconductor thin film, an amorphous silicon film may be typically used. Other than this, as the semiconductor thin film, a compound of silicon and germanium indicated by $Si_xGe_{1-x}$ (0<X<1) can also be used. The thickness of the amorphous semiconductor thin film is 25 to 100 nm (preferably 30 to 60 nm).

Since impurities, such as carbon, oxygen, and nitrogen, mixed in a film may hinder subsequent crystallization, it is preferable to thoroughly reduce them. Specifically, it is preferable that the concentration of any of carbon and nitrogen is less than $5 \times 10^{18}$ atoms/cm$^3$ (typically not larger than $5 \times 10^{17}$ atoms/cm$^3$), and the concentration of oxygen is less than $1.5 \times 10^{19}$ atoms/cm$^3$ (typically not larger than $1 \times 10^{18}$ atoms/cm$^3$). If the concentration of the impurities is the foregoing one, the concentration of the foregoing impurities in a completed TFT is also fallen within the foregoing range.

At the time of film formation, it is effective to add an impurity element (element in group 13, typically boron, or element in group 15, typically phosphorus) for controlling a threshold voltage (Vth) of a TFT. It is necessary to determine the amount of addition in view of Vth in the case where the foregoing Vth controlling impurity is not added.

Next, a crystallizing step of the amorphous semiconductor thin film is carried out. As means for crystallization, a technique disclosed in Japanese Patent Application Laid-open No. Hei. 7-130652 by the present inventors is used. Although any of means of embodiment 1 and embodiment 2 of the publication may be used, in the present invention, it is preferable to use technical contents (disclosed in Japanese Patent Application Laid-open No. Hei. 8-78329 in detail) set forth in the embodiment 2. Entire disclosure of these patents are incorporated herein by reference. U.S. Pat. No. 5,643,826 relates to the Japanese Laid-Open 7-130652. The entire disclosure of this U.S. Patent is also incorporated herein by reference.

According to the technique disclosed in Japanese Patent Application Laid-open No. Hei. 8-78329, first, a mask insulating film for selecting an added region of a catalytic element is formed. Then a solution containing the catalytic element for facilitating crystallization of the amorphous semiconductor thin film is applied by a spin coating method, and a catalytic element containing layer is formed.

As the catalytic element, one kind or plural kinds of elements selected from nickel (Ni), cobalt (Co), iron (Fe), palladium (Pd), platinum (Pt), copper (Cu), gold (Au), germanium (Ge), and lead (Pb) can be used. Especially, it is preferable to use nickel that is superior in the consistency of lattice with silicon.

The adding step of the foregoing catalytic element is not limited to the spin coating method, but an ion implantation method or plasma doping method using a mask can also be used. In this case, since it becomes easy to decrease an occupied area of the added region and to control the growth distance of a lateral growth region, it becomes an effective technique when a microscopic circuit is constructed.

Next, after the adding step of the catalytic element is ended, dehydrogenating is carried out at about 500° C. for 2 hours, and then a heat treatment is carried out in an inert gas atmosphere, a hydrogen atmosphere, or an oxygen atmosphere at a temperature of 500 to 700° C. (typically 550 to 650° C., preferably 570° C.) for 4 to 24 hours to crystallize the amorphous semiconductor thin film.

At this time, crystallization of the amorphous semiconductor thin film proceeds first from nuclei produced in the regions added with the catalytic element, and crystal regions grown almost parallel to the surface of the substrate are formed. The present inventors refer to this crystal region as a lateral growth region. The lateral growth region has such an advantage that the total crystallinity is superior since respective crystals are gathered in a comparatively uniform state.

After the heat treatment for crystallization is ended, the mask insulating film is removed and a heat treatment (gettering step of the catalytic element) for removing the catalytic element is carried out. In this heat treatment, a halogen element is contained in a processing atmosphere, and a gettering effect of the halogen element for a metal element is used.

In order to sufficiently obtain the gettering effect by the halogen element, it is preferable to carry out the above heat treatment at a temperature exceeding 700° C. If the temperature is not higher than 700° C., it becomes difficult to decompose a halogen compound in the processing atmosphere, so that there is a fear that the gettering effect can not be obtained. Thus, the temperature of the heat treatment is preferably 800 to 1000° C. (typically 950° C.), and a processing time is 0.1 to 6 hours, typically 0.5 to 1 hour.

Typically, it is appropriate that a heat treatment is carried out in an oxygen atmosphere containing hydrogen chlorine (HCl) of 0.5 to 10 vol % (preferably, 3 vol %) at 950° C. for 30 minutes. If the concentration of HCl is higher than the above-mentioned concentration, inequality comparable to a film thickness is produced on the surface of the lateral growth region. Thus, such a high concentration is not preferable.

As a compound containing a halogen element, one kind of or plural kinds of compounds selected from compounds containing halogen elements, such as HF, $NF_3$, HBr, $Cl_2$, $ClF_3$, $BCl_3$, $F_2$, and $Br_2$, may be used other than the HCl gas.

In this step, the catalytic element in the lateral growth region is gettered by the action of chlorine and is transformed into volatile chloride which is released into the air and is removed. After this step, the concentration of the catalytic element in the lateral growth region is lowered down to $5\times10^{17}$ atoms/cm$^3$ or less (typically $2\times10^{17}$ atoms/cm$^3$ or less).

The thus obtained lateral growth region shows unique crystal structure made of a collective of rod-like or flattened rod-like crystals. The feature will be described below.

Findings as to Crystal Structure of a Lateral Growth Region

The lateral growth region formed in accordance with the foregoing manufacturing steps has microscopically a crystal structure in which a plurality of rod-like (or flattened rod-like) crystals are arranged in almost parallel to each other and with regularity to a specific direction. This can be easily confirmed by observation with a TEM (Transmission Electron Microscopy).

Figure 8A:
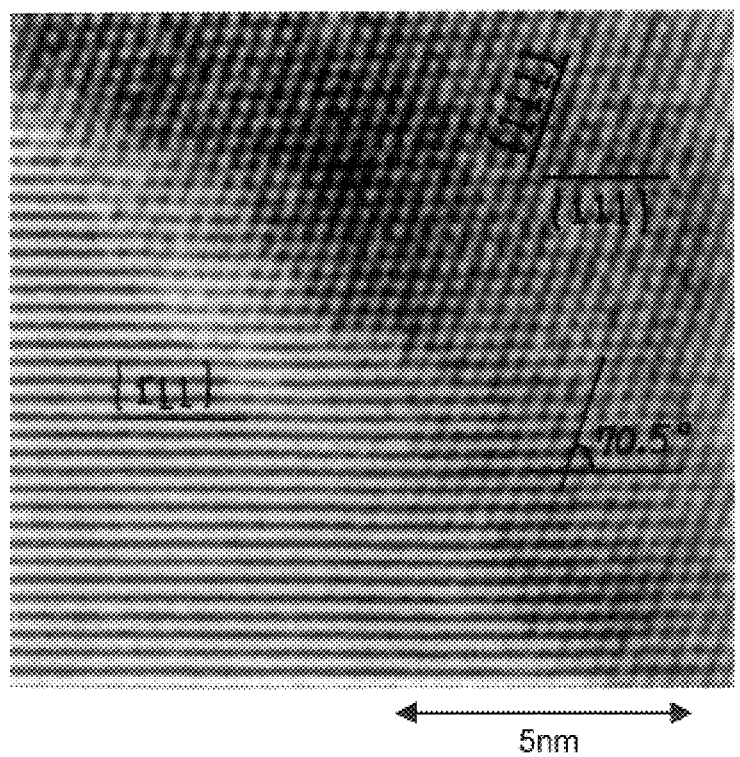
FIGS. 8A and 8B are views of TEM photographs.

The present inventors observed the crystal grain boundaries of the semiconductor thin film of the present invention in detail by an HR-TEM (High Resolution Transmission Electron Microscopy) (FIG. 8A). In the present specification, the crystal grain boundary is defined as a grain boundary formed at an interface where different rod-like crystals are in contact with each other, unless specified otherwise. Thus, the crystal grin boundary is regarded differently from, for example, a macroscopic grain boundary formed by collision of separate lateral growth regions.

The foregoing HR-TEM (High Resolution Transmission Electron Microscope) is a method in which a sample is vertically irradiated with an electron beam and the arrangement of atoms and molecules is estimated by using interference of transmission electrons or elastically scattered electrons. By using this method, it is possible to observe the state of arrangement of crystal lattices as lattice stripes. Thus, by observing the crystal grain boundary, it is possible to infer the bonding state of atoms at the crystal grain boundary.

In the TEM photograph (FIG. 8A) obtained by the present inventors, the state where two different crystal grains (rod-like crystal grains) are in contact with each other at the crystal grain boundary is clearly observed. At this time, it is ascertained by the electron beam diffraction that the two crystal grains are almost in {110} orientation although some deviations are included in crystal axes.

In the observation of lattice stripes by the TEM photograph as described above, lattice stripes corresponding to a {111} plane are observed in the {110} plane. The lattice stripe corresponding to the {111} plane indicates such a lattice stripe that when crystal grain is cut along the lattice stripe, the {111} plane appears in the section. It is possible to simply ascertain through the distance between the lattice stripes to what plane the lattice stripe corresponds.

At this time, the present inventors observed in detail the TEM photograph of the semiconductor thin film of the present invention, and as a result, very interesting findings were obtained. In any of the two different crystal grains seen in the photograph, lattice stripes corresponding to the {111} plane were seen. And it was observed that the lattice stripes were obviously parallel to each other.

Further, irrespective of the existence of the crystal grain boundary, lattice stripes of the two different crystal grains were connected to each other so as to cross the crystal grain boundary. That is, it was confirmed that almost all lattice stripes observed to cross the crystal grain boundary were linearly continuous in spite of the fact that they were lattice stripes of different crystal grains. This is the case with any crystal grain boundary.

Such a crystal structure (precisely the structure of crystal grain boundary) indicates that two different crystal grains are in contact with each other with excellent conformity in the crystal grain boundary. That is, crystal lattices are continuously connected to each other in the crystal grain boundary, so that such a structure is formed that trap levels caused by crystal defects or the like are not easily formed. In other words, it can be said that the crystal lattices are continuous in the crystal grain boundary.

Figure 8B:
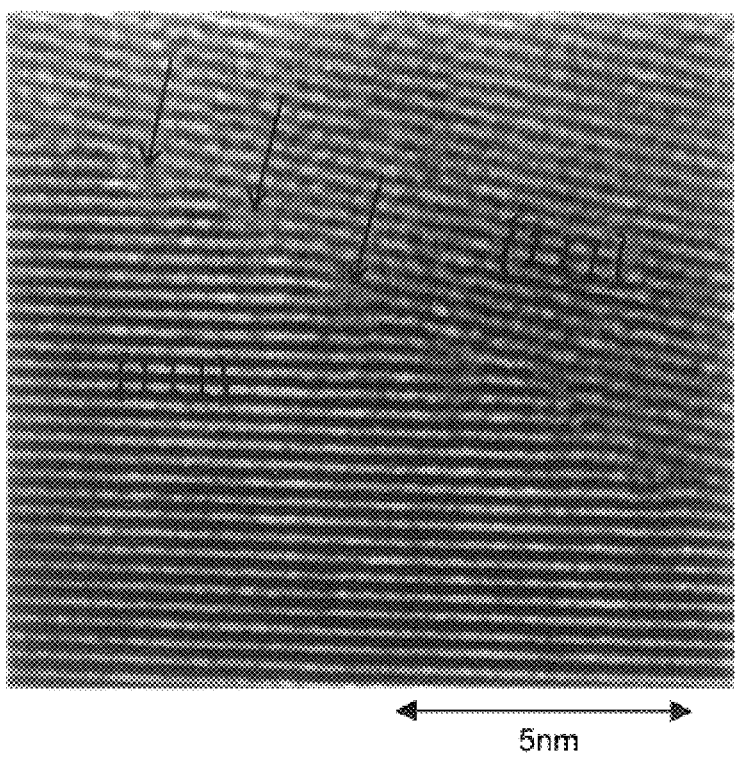

In FIG. 8B, for reference, analysis by the electron beam diffraction and HR-TEM observation was carried out by the present inventors for a conventional polycrystalline silicon film (so-called high temperature polysilicon film) as well. As a result, it was found that lattice stripes were random in the two different crystal grains and there hardly existed connection continuous in the crystal grain boundary with excellent conformity. That is, it was found that there were many portions where the lattice stripes were cut in the crystal grain boundary, and there were many crystal defects.

The present inventors refer to the bonding state of atoms in the case where the lattice stripes correspond to each other with good conformity, as in the semiconductor thin film used in the present invention, as conformity bonding, and refers to a bond at that time as a conformity bond. On the contrary, the present inventors refer to the bonding state of atoms in the case where the lattice stripes do not correspond to each other with good conformity, often seen in a conventional polycrystalline silicon film, as unconformity bonding, and refers to a bond at that time as an unconformity bond (or a dangling bond).

Since the semiconductor thin film used in the present invention is extremely excellent in conformity at the crystal grain boundary, the foregoing unconformity bonds are very few. As a result of study for arbitrary plural crystal grain boundaries conducted by the present inventors, the existing ratio of the unconformity bonds to the total bonds was 10% or less (preferably 5% or less, more preferably 3% or less). That is, 90% or more of the total bonds (preferably 95% or more, more preferably 97% or more) are constituted by the conformity bonds.

Figure 9A:
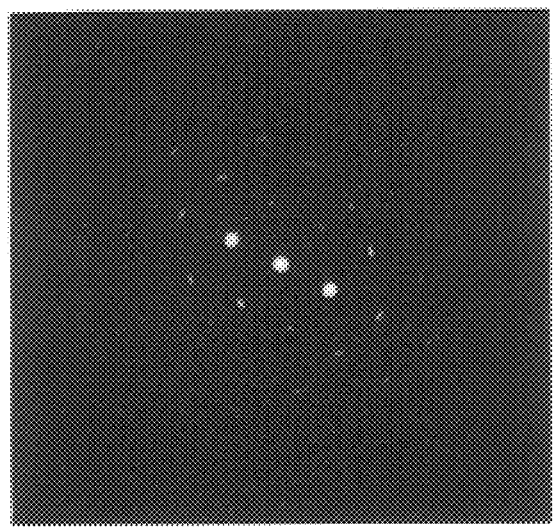
FIGS. 9A and 9B are views of electron beam diffraction patterns.
Figure 9B:

FIG. 9A shows a result of observation by the electron beam diffraction for a lateral growth region formed in accordance with the foregoing steps. FIG. 9B shows an electron beam diffraction pattern of a conventional polysilicon film (called a high temperature polysilicon film) observed for comparison.

In the electron beam diffraction patterns shown in FIGS. 9A and 9B, the diameter of an irradiation area of an electron beam is 4.25 µm, and the information of a sufficiently wide region is collected. The photographs shown here show typical diffraction patterns in the results of investigation for arbitrary plural portions.

In the case of FIG. 9A, diffraction spots corresponding to the <110> incidence appear comparatively clearly, and it can be ascertained that almost all crystal grains in the irradiation area of the electron beam are in {110} orientation. On the other hand, in the case of the conventional high temperature polysilicon film shown in FIG. 9B, clear regularity can not be seen in the diffraction spots, and it is found that grain boundaries with plane orientation other than {110} plane are irregularly mixed.

Thus, the feature of the semiconductor thin film used in the present invention is that this film shows the electron beam diffraction pattern having regularity peculiar to the {110} orientation, although this film is a semiconductor thin film having crystal grain boundaries. When electron beam diffraction patterns are compared, the difference from the conventional semiconductor thin film is clear.

As described above, the semiconductor thin film manufactured by the foregoing manufacturing steps is a semiconductor thin film having crystal structure (precisely structure of a crystal grain boundary) quite different from the conventional semiconductor thin film. The present inventors have explained the result of analysis as to the semiconductor thin film used in the present invention in Japanese Patent Application Nos. Hei. 9-55633, Hei. 9-165216 and Hei. 9-212428, U.S. pending applications Ser. Nos. 09/027,344, 09/084,738 and 09/120,290, entire disclosures of which are incorporated herein by reference.

Since 90% or more of the crystal grain boundaries of the semiconductor thin film used in the present invention as described above are constituted by conformity bonds, they hardly have a function as a barrier against movement of carriers. That is, it can be said that the semiconductor thin film used in the present invention has substantially no crystal grain boundary.

In a conventional semiconductor thin film, although the crystal grain boundary serves as a barrier for blocking the movement of carriers, since such a crystal grain boundary does not substantially exist in the semiconductor thin film used in the present invention, high carrier mobility can be realized. Thus, the electrical characteristics of a TFT manufactured by using the semiconductor thin film used in the present invention show very excellent values. This will be described below.

Findings as to electrical characteristics of a TFT

Since the semiconductor thin film used in the present invention can be regarded substantially as single crystal (crystal grain boundaries do not exist substantially), a TFT using the semiconductor thin film as an active layer shows electrical characteristics comparable with a MOSFET using single crystal silicon. Data as shown below are obtained from TFTs experimentally formed by the present inventors.

(1) The subthreshold coefficient as an index showing switching performance (promptness in switching of on/off operation) of a TFT is as small as 60 to 100 mV/decade (typically 60 to 85 mV/decade) for both an N-channel TFT and a P-channel TFT.

(2) The field effect mobility (OFE) as an index showing an operation speed of a TFT is as large as 200 to 650 $cm^2/Vs$ (typically 250 to 300 $cm^2/Vs$) for an N-channel TFT, and 100 to 300 $cm^2/Vs$ (typically 150 to 200 $cm^2/Vs$) for a P-channel TFT.

(3) The threshold voltage ($V_{th}$) as an index indicating a driving voltage of a TFT is as small as −0.5 to 1.5 V for an N-channel TFT and −1.5 to 0.5 V for a P-channel TFT.

As described above, it has been ascertained that extremely superior switching characteristics and high speed operation characteristics can be realized.

Incidentally, in the formation of the CGS, the foregoing annealing step at a temperature (700 to 1100° C.) above crystallizing temperature plays an important role with respect to lowering of defects in the crystal grain. This will be described below.

Figure 10A:
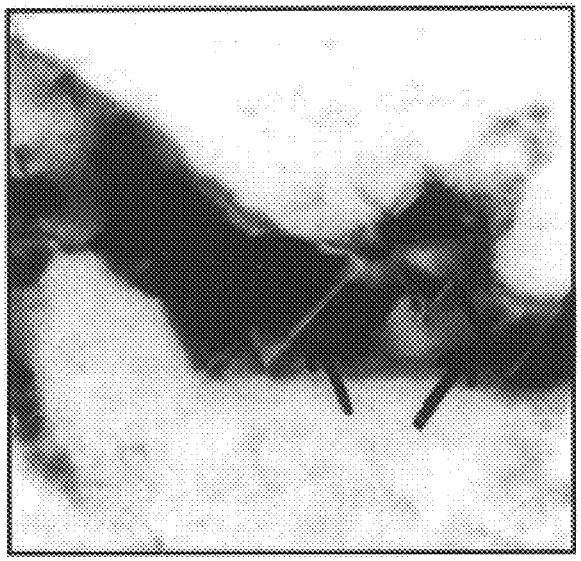
FIGS. 10A and 10B are views of TEM photographs.

FIG. 10A is a TEM photograph of a crystal silicon film at a time point when steps up to the foregoing crystallization step have been ended, which is magnified 250 thousand times. Zigzag defects as indicated by an arrow are ascertained in the crystal grain (black portion and white portion appear due to the difference of contrast).

Although such defects are mainly lamination defects in which the order of lamination of atoms on a silicon crystal lattice plane is discrepant, there is also a case of dislocation. It appears that FIG. 10A shows a lamination defect having a defect plane parallel to the {111} plane. This can be ascertained from the fact that the zigzag defects are bent at about 70°.

Figure 10B:
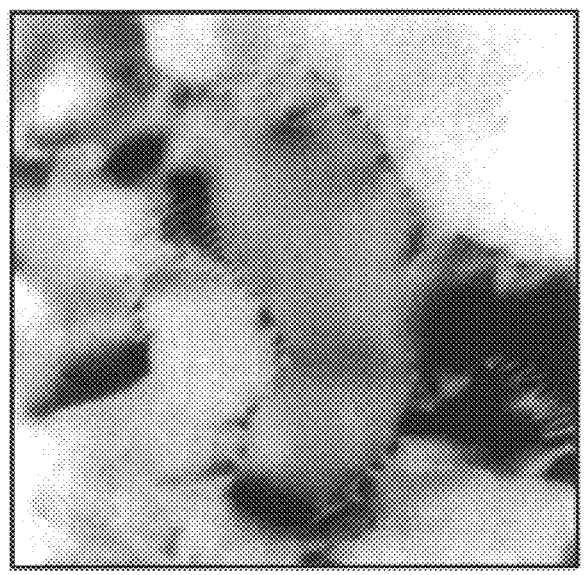

On the other hand, as shown in FIG. 10B, in the crystal silicon film used in the present invention, which is enlarged at the same magnification, it is ascertained that defects caused by lamination defects, dislocations, and the like are hardly seen, and the crystallinity is very high. This tendency can be seen in the entire of the film surface, and although it is difficult to decrease the number of defects to zero under the present circumstances, it is possible to decrease the number to substantially zero.

That is, in the crystal silicon film used in the present invention, defects in the crystal grain are reduced to the degree that the defects can be almost neglected, and the crystal grain boundary can not become a barrier against movement of carriers because of its high continuity, so that the film can be regarded as single crystal or substantially single crystal.

Thus, in the crystal silicon films shown in the photographs of FIGS. 10A and 10B, although any of the crystal grain boundaries have almost equal continuity, there is a large difference in the number of defects in the crystal grains. The reason why the crystal silicon film of the present invention shows electrical characteristics much higher than the crystal silicon film shown in FIG. 10A is mainly the difference in the number of defects.

From the above, it is understood that the gettering process of a catalytic element is an indispensable step in the present invention. The present inventors consider the following model for a phenomenon occurring in this step.

First, in the state shown in FIG. 10A, the catalytic element (typically nickel) is segregated at the defects (mainly lamination defects) in the crystal grain. That is, it is conceivable that there are many bonds having a form such as Si—Ni—Si.

However, when Ni existing in the defects is removed by carrying out the gettering process of the catalytic element, the bond of Si—Ni is cut. Thus, the remaining bond of silicon immediately forms Si—Si bond and becomes stable. In this way, the defects disappear.

Of course, although it is known that the defects in the crystal silicon film disappear by thermal annealing at a high temperature, it is presumed that since bonds with nickel are cut and many unpaired bonds are produced, so that recombination of silicon is smoothly carried out.

The present inventors consider also a model in which the crystal silicon film is bonded to its under film by a heat treatment at a temperature (700 to 1100° C.) above the crystallizing temperature and adhesiveness is increased, so that the defects disappear.

The thus obtained crystal silicon film (FIG. 10B) used in the present invention has the feature that the number of defects in the crystal grains is extremely smaller than the crystal silicon film (FIG. 10A) in which merely crystallization is carried out. The difference in the number of defects appears as the difference in spin density by the analysis of ESR (Electron Spin Resonance). Under the present circumstances, the spin density of the crystal silicon film used in the present invention is at least $1 \times 10^{18}$ spins/cm$^3$ (preferably $5 \times 10^{17}$ spins/cm$^3$ or less).

The crystal silicon film used in the present invention and having the above described crystal structure the features and is referred to as continuous grain boundary crystal silicon (Continuous Grain Silicon: CGS).

EMBODIMENT 5

In the display unit of each of the above embodiments, in the case where high resolution is intended to realize, a writing period must be shortened. This embodiment shows an example in which, in the case where picture information of comparatively high quality is used, an antiferroelectric liquid crystal having substantially no threshold value is used as a liquid crystal material of a liquid crystal panel used in the above respective embodiments.

Since a liquid crystal material used in a conventional LCD has a slow response speed (several tens ms to several hundreds ms) to application of voltage, even if a driving circuit is constituted by TFTs capable of operating in a high frequency band by using, for example, crystal silicon (CGS), the liquid crystal material can not respond to the high speed operation.

However, in this embodiment, crystal silicon (CGS) is used, a TFT capable of operating in a high frequency band is used as a switching element of a liquid crystal panel, and an antiferroelectric liquid crystal having a high response speed to application of voltage and having substantially no threshold value is used, so that it is possible to realize a display unit with no flicker, high fineness, and high resolution.

EMBODIMENT 6

This embodiment shows an example of a structure in which light emitting diodes of R (red), G (green), and B (blue) are used as backlight and are incorporated in a display unit main body, so that a color picture is obtained. As color display in this case, for example, if the blink of R, G, and B of the light emitting diodes is repeated at a frequency three times a writing period of one screen (called a frame frequency) in time series for each color as R, G, B, R, G, B, R . . . , it is recognized by a human eye as a color picture. In this embodiment, one screen is written at 60 Hz, and the blink of R, G, and B of the light emitting diodes are repeated at 180 Hz, that is the value three times the writing frequency for each color as R, G, B, R, G, B, R . . . in time series. The writing period (called a frame frequency) of one screen is not particularly limited as long as it is 45 Hz or more, preferably 60 Hz or more. In this case, since a color filter is not required, bright display can be obtained.

Instead of the light emitting diodes, a light emitting element such as an EL element may be used to form the backlight. Incidentally, this embodiment can be freely combined with the embodiments 1 to 5.

EMBODIMENT 7

In this embodiment, an example in which a display unit (CGS is used for a channel formation region of a switching element of a liquid crystal panel) of the above respective embodiments is used to carry out an information communication operation, will be described with reference to FIG. 11.

Figure 11:
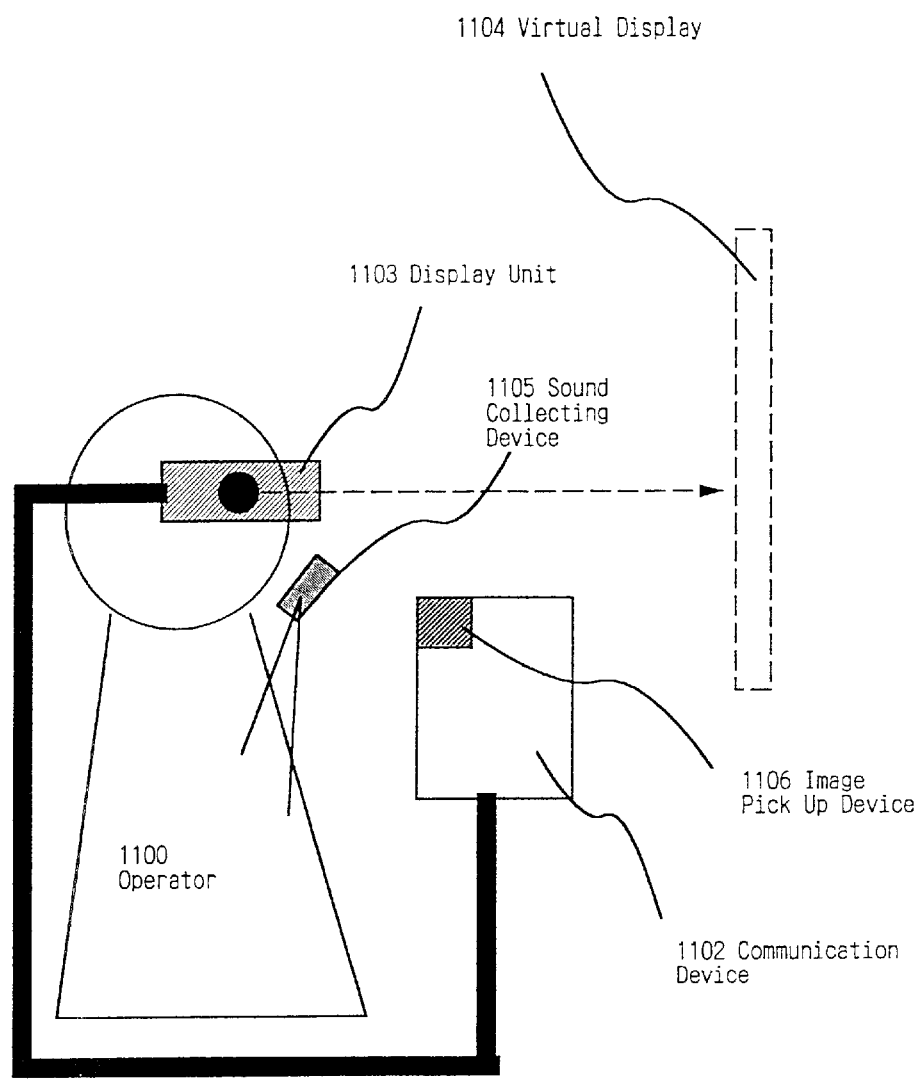
FIG. 11 is a view showing an example using a communication unit.

FIG. 11 shows an example of a TV telephone in which an information processing device and its system are made up of a display unit 1103, a communication unit 1102, a sound collecting unit 1105, and an image pick-up unit 1106, and a virtual picture (flat picture or three-dimensional picture) can be presented to a user.

A user 1100 connects the display unit with the communication unit 1102, such as a telephone, through a telephone line or communication cable, and uses the sound collecting device 1105 such as a mike, and the image pick-up device 1106 such as a camera, to carry out an information processing operation (transmission of voice data of the user, transmission of pictures of, for example, an expression of the user, and the like) to a communication partner. It is also possible to take such a structure that the communication unit and the display unit are connected with each other through a control unit such as a computer.

In the case where a virtual three-dimensional picture such as the expression of the user is transmitted, it is desirable to employ such a structure that an image pick-up device for forming a picture signal for a right eye and an image pick-up device for forming a picture signal for a left eye are separately provided in the display unit, the communication unit, or the control unit so that two picture signals are transmitted.

When this information processing device and its system is used, the user can carry out the information processing operation (conversation, exchange of electronic documents, etc.) while seeing a picture transmitted from the communication partner. Since the user can cut off an outside during the information processing operation, he or she can concentrate on the virtual display screen. Moreover, since the user is cut off from a surrounding environment, he or she can relax. In addition, since the virtual screen can be superimposed on a surrounding scene and is displayed, this device is convenient.

In a TV phone using a conventional display unit such as a CRT, there is a fear that information is seen by a surrounding person other than the user. However, since the information processing device and its system of this embodiment uses a virtual picture, there is no fear that the virtual picture is seen by a person other than the user putting on the display unit, so that exchange of information can be made at ease without paying attention to surroundings.

If a portable small unit, such as a portable telephone, is used as the communication unit connected with the display unit, information communication can be made at any place. Further, when a small image pick-up device is mounted on this small communication unit, a portable TV phone can be realized. An example in which an information communication operation is carried out by using a small communication unit will be described with reference to FIG. 12.

Figure 12:
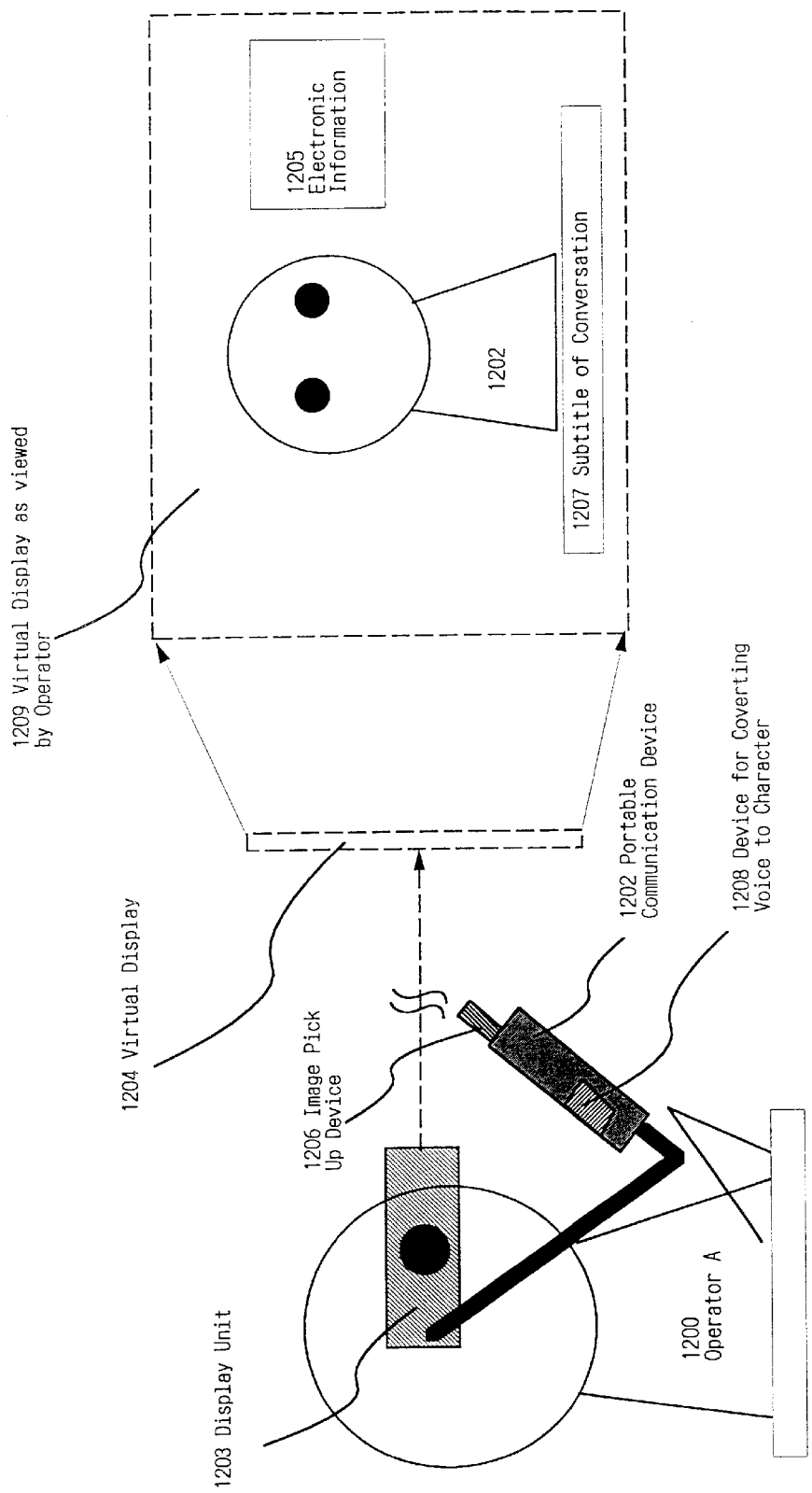
FIG. 12 is a view showing an example using a small communication unit.
Figure 13:
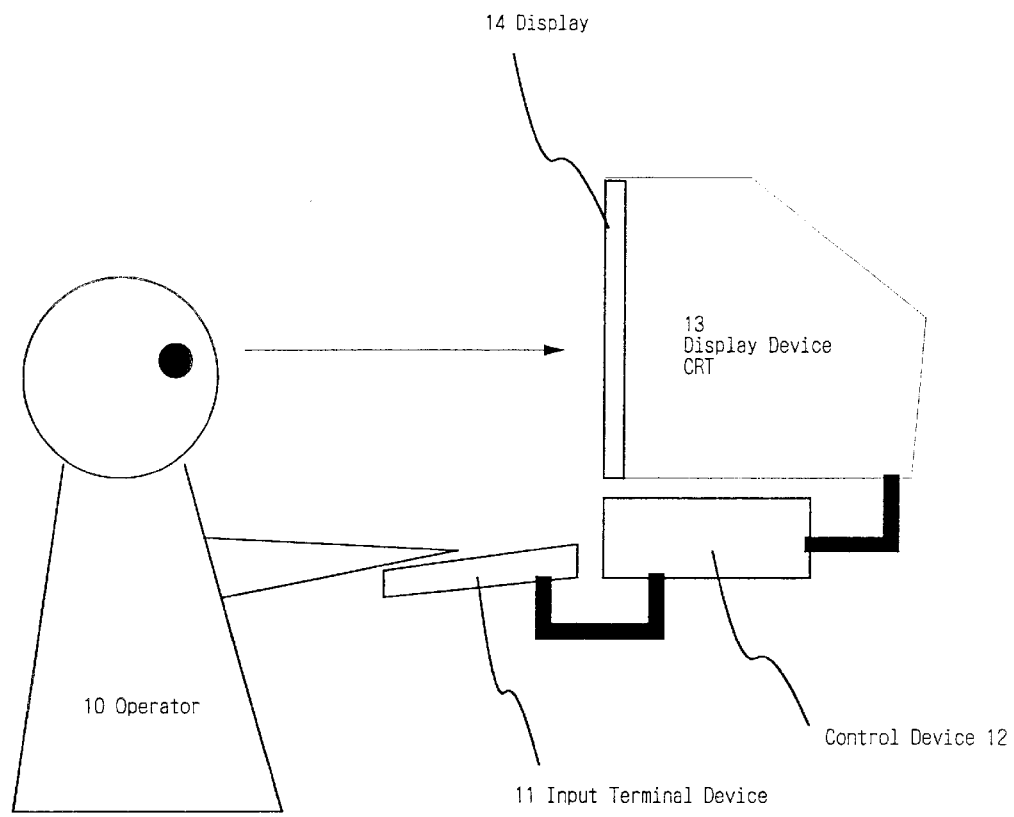
FIG. 13 is a view showing an outline of a conventional information processing device.

FIG. 12 shows an example of a TV phone in which an information processing device and its system are made up of a display unit 1203, a small communication unit 1202, and a small image pick-up unit 1206, and a virtual display screen 1204 (flat picture or three-dimensional picture) can be presented to a user 1200. The small communication unit 1202 has a built-in sound collecting device (mike, etc.) which can input the voice of the user as voice data. Further, this device incorporates also an input unit that can simply input characters.

In addition, when a device 1208 for automatically converting the voice data of the user into characters is incorporated in the display unit, the communication unit, or the control unit, a conversation and the like can be virtually displayed as characters at the same time. By adding such functions, as shown in FIG. 12, on a virtual screen 1209 seen from the user 1200, the user has a conversation while seeing a picture (picture of the upper half of a communication partner, and the like) transmitted from a communication partner 1210, and at the same time, the conversation is converted into characters and is displayed on a sentence display section 1207 of conversation, and electronic information is displayed on an electronic information section 1205. The virtual screen 1209 seen from the user 1200 corresponds to the virtual display screen 1204. Display portions of the foregoing display sections 1205 and 1207 are not particularly limited.

Since it is also possible to store the conversation as characters at the same time, it is not necessary to note down, and exchange of information can be accurately made. Even if the user is deficient in the sense of hearing, he or she can make an accurate conversation while seeing virtually displayed characters.

In a conventional HMD, it has been impossible to obtain such resolution that fine characters can be accurately recognized, which for the first time becomes possible by the HMD of this embodiment using CGS for a channel formation region.

In this embodiment, a conventional display screen (CRT, etc.) is not required, but merely virtual display is made, so that an information processing operation (conversation with a communication partner, exchange of picture information with the communication partner, and the like) is possible at any place and under any environment.

As described above, in an information processing device provided with a display unit (HMD) of the present invention, crystal silicon forming an active layer of a thin film transistor of a liquid crystal panel is CGS, so that the device can deal with a picture signal (60 Hz or more) of comparatively high quality, and a virtual picture (2D or 3D) having high resolution can be obtained.

Moreover, although the distance between the liquid crystal panel and an eye is as small as several cm, since a period of polarity inversion of frame inversion driving is short (45 Hz to 180 Hz), a flicker is not produced, so that an influence on human eyes can be reduced. That is, a using time can be prolonged as compared with the prior art.

In addition, a conventional HMD has low resolution and reading of fine characters is difficult. Fine characters can be clearly recognized in the liquid crystal panel of the present invention so that an information processing operation can be accurately carried out. That is, the HMD disclosed in the present specification is optimum for a display unit of an information processing device.

In the information processing device disclosed in the present specification, since a user can cut off an outside during an information processing operation, he or she can concentrate on a virtual display screen. Besides, since the user is cut off from a surrounding environment, he or she can relax. Further, the virtual screen can be superimposed on a surrounding scene and can be displayed.

Moreover, the device can not narrow the space on a desk and the like, the space can be effectively used. Further, since the device is lightweight, it can be carried and an information processing operation can be made at any place.

For example, when a portable telephone or communication line of a public telephone is used and the line is connected to the display unit of the present invention, information exchange (conversation, etc.) can be made while seeing a picture or information of a communication partner.

If a liquid crystal material (for example, AFLC with no threshold value) with a high response speed is used, a further high resolution picture can be obtained.

As described above, the head mount display disclosed in the present specification can be made optimum for the display unit at the information processing operation, and excellent information processing operation environment is provided by using the information processing device provided with the display unit and its system.

Also, while the present invention has been explained in conjunction with the preferred embodiments, the present invention should not be limited to the particular structures of these embodiments. Various modifications may be made without departing the scope of the appended claims. For example, if desired, the display system has only one display panel to be set in front of one of right any left eyes so that the user can see another thing by using the other one of the eyes.

What is claimed is:

1. An information processing device comprising:
a display unit comprising flat panel displays for a right eye and a left eye and being mounted on a head of a user;
a control unit operationally connected to said display unit; and
an input operating unit connected to said control unit,
wherein each of said flat panel displays comprises a plurality of first thin film transistors, each having a channel formation region, arranged in a matrix for switching pixels and a driver circuit comprising second thin film transistors for driving said first thin film transistors, said first and second thin film transistors formed over a same substrate,
wherein said display unit, said control unit and said input operating unit are adapted to be used by the same user, and
wherein 90% or more of crystal lattices in crystal grain boundaries of the channel formation region have continuity.

2. An information processing device according to claim 1, wherein said input operating unit is a sound collecting unit.

3. An information processing device according to claim 1, wherein said input operating unit is an image pick-up unit.

4. An information processing device according to claim 1, wherein the channel formation region of a TFT connected to a pixel electrode of said flat panel displays of said display unit is constituted of a semiconductor thin film that is a collective of a plurality of rod-like or flattered rod-like crystals formed on an insulating surface.

5. An information processing device according to claim 4, wherein a surface orientation of the channel formation region is substantially a {110} orientation.

6. An information processing device according to claim 1, wherein writing of one screen is carried out at 45 Hz to 180 Hz in said flat panel displays, and a polarity of voltage applied to a pixel electrode is inverted for every screen to obtain screen display in said display unit.

7. An information processing device according to claim 1, wherein a liquid crystal material of said flat panel displays of said display unit is an antiferroelectric liquid crystal substantially having no threshold value.

8. An information processing device according to claim 1, wherein said display unit comprising said flat panel displays for the right eye and the left eye and being mounted on the head of the user, provides a virtual flat picture to the user.

9. An information processing device according to claim 1, wherein said display unit comprising said flat panel display for the right eye and the left eye and being mounted on the head of the user, provides a virtual three-dimensional picture to the user.

10. An information processing device comprising:
a display unit comprising flat panel displays for a right eye and a left eye and being mounted on a head of a user;
a communication unit connected to said display unit; and
an input operating unit,
wherein said communication unit is used so that information from a communication partner is received by the user, and
said input operating unit is used so that information is transmitted to the communication partner,
wherein 90% or more of crystal lattices in crystal grain boundaries of the channel formation region have continuity.

11. An information processing device according to claim 10, wherein said input operating unit is a sound collecting unit.

12. An information processing device according to claim 10, wherein said input operating unit is an image pick-up unit.

13. An information processing device according to claim 10, wherein writing of one screen is carried out at 45 Hz to 180 Hz in said flat panel displays, and a polarity of voltage applied to a pixel electrode is inverted for every screen to obtain screen display in said display unit.

14. The information processing device according to claim 10 wherein said substrate is a glass substrate.

15. An information processing device comprising:
a communication device comprising an input operating unit for inputting a voice data of a user and a unit for covering said voice data into characters and transmitting them to a communication partner; and
a display unit operationally connected to said communication device and comprising flat panel displays for a right eye and a left eye and being mounted on a head of a user,
wherein each of said flat panel displays comprises a plurality of first thin film transistors, each having a channel formation region, arranged in a matrix for switching pixels and a driver circuit comprising second thin film transistors for driving said first thin film transistors, said first and second thin film transistors formed over a same substrate
wherein said communication device and said display unit are adapted to be used by the same user, and
wherein 90% or more of crystal lattices in crystal grain boundaries of the channel formation region have continuity.

16. An information processing device comprising:
a display unit comprising flat panel displays for a right eye and a left eye and being mounted on a head of a user;
a communication device operationally connected to said display unit;
an input operating unit for inputting a voice data of a communication partner; and
a unit for converting the voice data of the communication partner into characters,
wherein said characters are displayed on a virtual display screen provided to the user by said display unit
wherein said communication device and said display unit are adapted to be used by the same user, and
wherein 90% or more of crystal lattices in crystal grain boundaries of the channel formation region have continuity.

17. An information processing device according to claims 15 or 16, wherein said input operating unit is a sound collecting unit.

18. An information processing device according to claim 16, wherein said input operating unit is an image pick-up unit.

19. An information processing device according to claim 16, wherein the channel formation region of a TFT connected to a pixel electrode of said flat panel displays of said display unit is constituted of a semiconductor thin film that is collective of a plurality of rod-like or flattened rod-like crystals formed on an insulating surface.

20. An information processing device according to claim 19, wherein a surface orientation of the channel formation region is substantially a {110} orientation.

21. An information processing device according to claim 16, wherein writing of one screen is carried out at 45 Hz to 180 Hz in said flat panel displays, and a polarity of voltage applied to a pixel electrode is inverted for every screen to obtain screen display in said display unit.

22. An information processing device according to claim 16, wherein a liquid crystal material of said flat panel displays of said display unit is an antiferroelectric liquid crystal substantially having no threshold value.

23. An information processing device according to claim 16, wherein said display unit comprising said flat panel displays for the right eye and the left eye and being mounted on the head of the user, provides a virtual flat picture to the user.

24. An information processing device according to claim 16, wherein said display unit comprising said flat panel display for the right eye and the left eye and being mounted on the head of the user, provides a virtual three-dimensional picture to the user.

25. An information processing device comprising:
a control device;
an input operating device operationally connected to said control device, through which a command is input to said control device by an operator; and
a display unit to be set on a face of the operator, said display unit including at least one display panel operationally connected to said control device, wherein said display panel is to be placed in front of an eye of the operator,
wherein said display panel comprises a substrate having an insulating surface, a plurality of pixel electrodes arranged in a matrix form over the substrate, a plurality of first thin film transistors, each having a channel formation region, for switching said pixel electrodes, and a driver circuit comprising a plurality of second thin film transistors for driving said first thin film transistors, said first and second thin film transistors comprising a crystalline semiconductor layer as an active layer thereof,
wherein said control device, said control device and said display unit are adapted to be used by the same user, and
wherein 90% or more of crystal lattices in crystal grain boundaries of the channel formation region have continuity.

26. An information processing device according to claim 25 wherein a two dimensional image is displayed on said display panel.

27. An information processing device according to claim 25 further comprising a device for converting voice data into characters wherein said characters are displayed on said display panel.

28. An information processing device according to claim 25 wherein said display panel is a liquid crystal display device.

29. An information processing device according to claim 28, wherein said thin film transistor has a subthreshold coefficient is within a range from 60 to 80 mV/decade.

30. An information processing device according to claim 15 wherein said input operating unit is an image pick-up unit.

31. An information processing device according to claim 15 wherein writing of one screen is carried out at 45 Hz to 180 Hz in said flat panel displays, and a polarity of voltage applied to a pixel electrode is inverted for every screen to obtain screen display in said display unit.

32. The information processing device according to claim 25 wherein said display panel is an electroluminescent display device.

33. The information processing device according to claim 25 wherein said display panel is driven at a frame frequency of 45 Hz or larger.

34. The information processing device according to claim 25 wherein said crystalline semiconductor layer comprises continuous grain silicon.

35. The information processing device according to claim 25 wherein said flat panel display is an electroluminescent display device.

* * * * *

UNITED STATES PATENT AND TRADEMARK OFFICE
CERTIFICATE OF CORRECTION

PATENT NO. : 6,580,405 B1
DATED : June 17, 2003
INVENTOR(S) : Yamazaki et al.

It is certified that error appears in the above-identified patent and that said Letters Patent is hereby corrected as shown below:

<u>Title page,</u>
Item [56], References Cited, FOREIGN PATENT DOCUMENTS, insert the following references:

|  |  |  |
|---|---|---|
| -- PCT | 96 07947 | 03/14/1996 |
| PCT | 97 31477 | 08/28/1997 |
| EPA | 0 720 338A | 07/03/1996 |
| EPA | 0 827 337 A1 | 03/04/1998 -- |

Signed and Sealed this

Twenty-seventh Day of July, 2004

JON W. DUDAS
*Acting Director of the United States Patent and Trademark Office*